July 27, 1965
C. K. JONES
3,197,016
TUBE FEEDER WITH FEED RESPONSIVE CONTROL MEANS
Filed Oct. 30, 1963
2 Sheets-Sheet 1
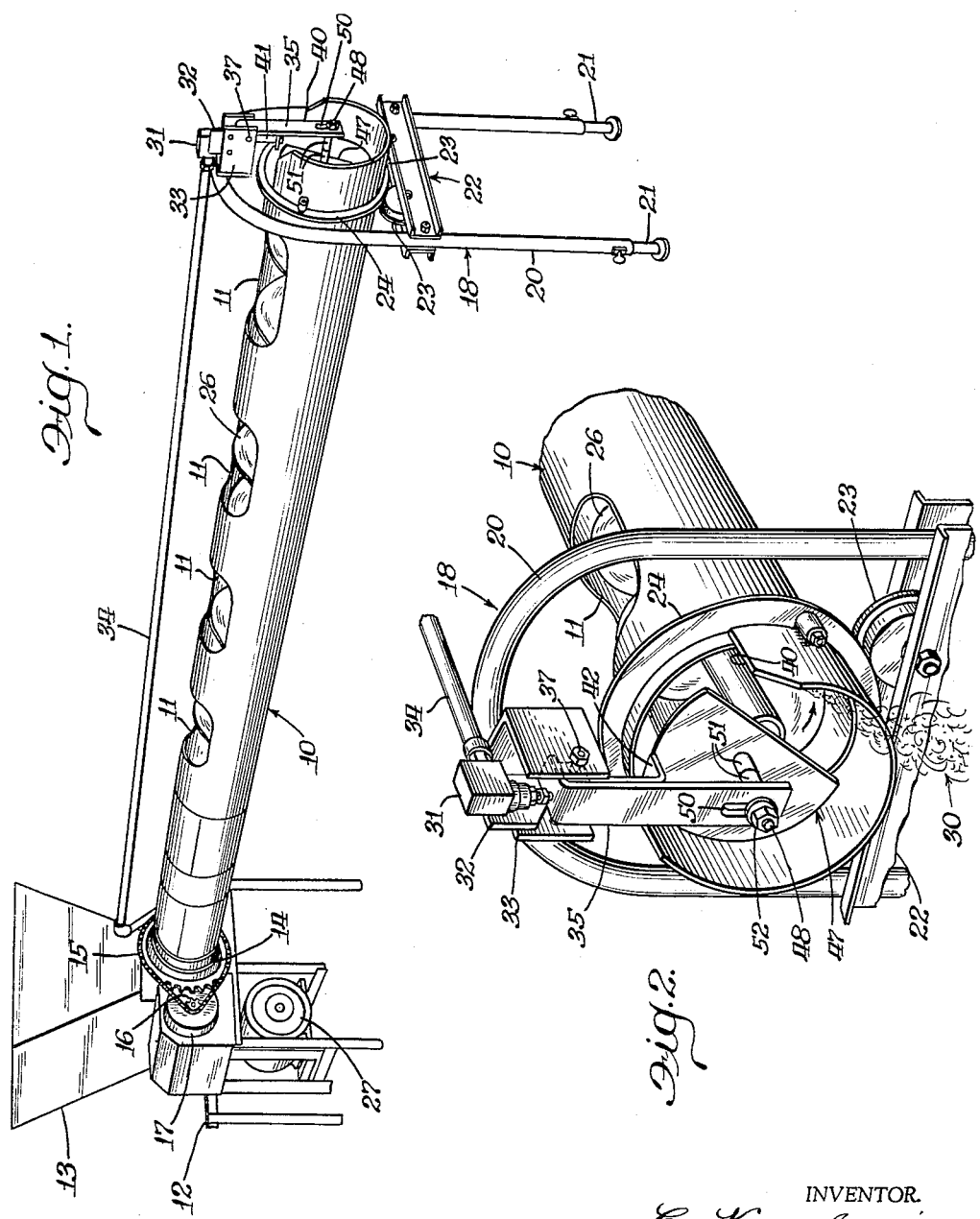
INVENTOR.
C. Ken Jones
BY Snow and Benno
Attys.

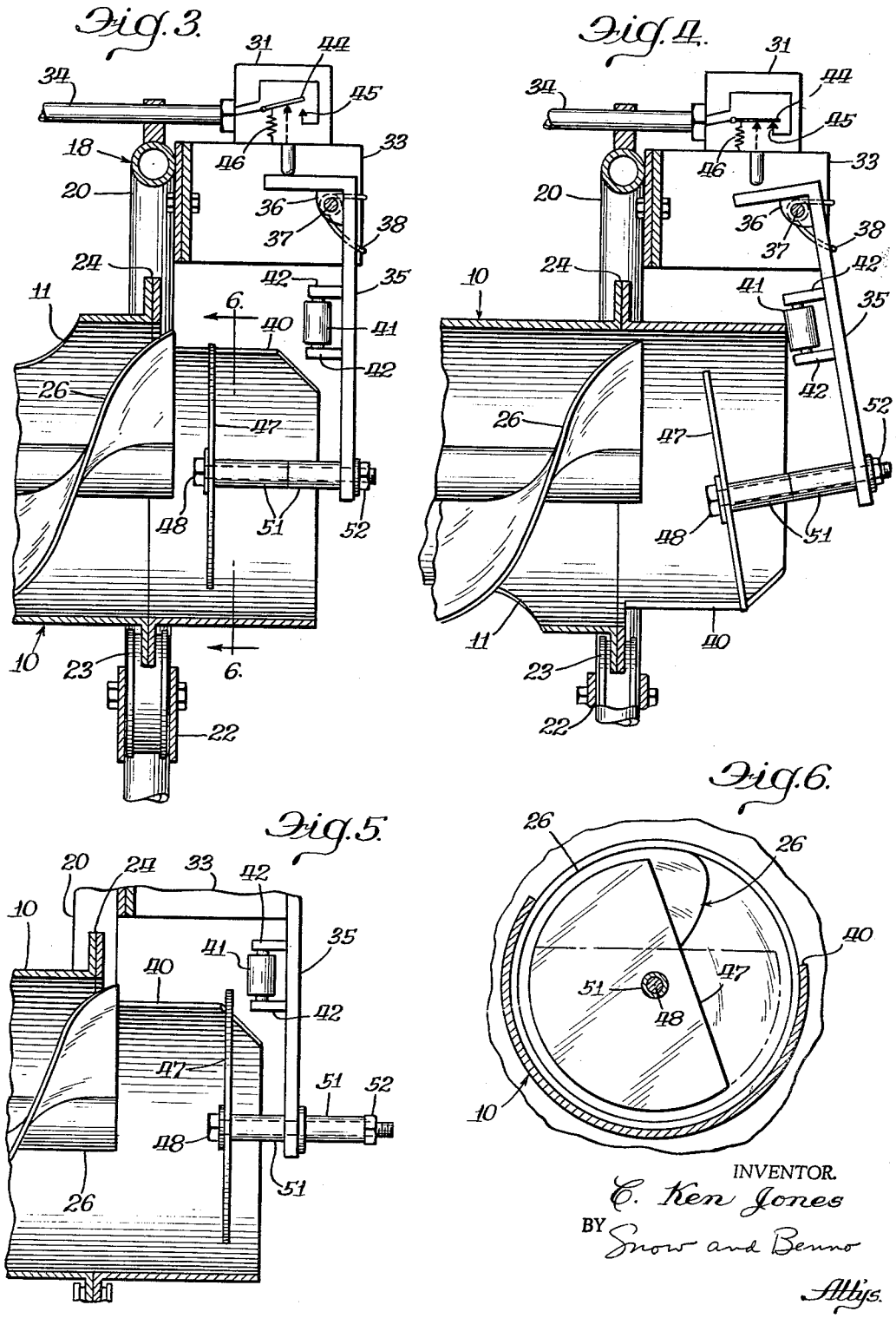

United States Patent Office 3,197,016
Patented July 27, 1965

3,197,016
TUBE FEEDER WITH FEED RESPONSIVE
CONTROL MEANS
Charles Ken Jones, Joliet, Ill., assignor to P & D Sales
& Mfg. Co., a division of The Neff and Fry Company,
a corporation of Ohio
Filed Oct. 30, 1963, Ser. No. 320,093
18 Claims. (Cl. 198—64)

This invention relates generally to tube feeders, and more particularly to an improved feed responsive dumping control for a tube feeder of the type having an auger conveyor for distributing feed longitudinally of a feed tube.

The primary object of the present invention is to provide a novel feed responsive dump control for a tube feeder in which the feed for actuating the dump control is delivered thereto by an auger conveyor.

It is a further object to provide a novel feed responsive dump control to which feed is delivered by an auger conveyor, and in which the dump control may be easily adjusted to provide for automatic dumping of feed from the tube when the tube is filled to some selected amount.

It is a further object to provide a novel feed responsive dump control according to the preceding paragraph in which the dump control is easily adjusted for accurate and selected response to many different types of feed.

It is still another object to provide a novel feed responsive dump control ideally suited for a livestock feeder of the type having a rotatable tube which is overturned for dumping of any feed therefrom and in which feed is distributed longitudinally of the tube by an auger conveyor receiving feed from a hopper at one end of the tube.

Other objects and features of the invention will be apparent upon a perusal of the following specification and drawings in which:

FIGURE 1 is a perspective view of one type of tube feeder incorporating the present invention;

FIGURE 2 is an enlarged partial end view of the structure shown in FIGURE 1;

FIGURE 3 is an enlarged side elevational view partially in cross section of the structure shown in FIGURE 2;

FIGURE 4 is a view similar to FIGURE 3 but with the dump control in the operated position thereof;

FIGURE 5 is a view similar to FIGURE 3 but showing a different adjusted position of the dump control; and FIGURE 6 is a cross sectional view of a portion of the structure shown in FIGURE 3 and taken substantially along the line 6—6 of FIGURE 3.

The present embodiment is the preferred embodiment, but it is to be understood that changes can be made in the present embodiment by one skilled in the art without departing from the spirit and scope of the present invention.

Generally, the present invention comprises a feed responsive dump control which is highly versatile, and which by its versatility solves many of the problems heretofore existing in the art of tube feeders. Tube feeders which are in use for the feeding of livestock, generally comprise some type of tube receiving feed at one end thereof, and the feed is usually distributed longitudinally of the tube by an auger conveyor. Such tubes and auger conveyors are of many different sizes depending upon the type of feed to be carried thereby and the particular livestock to be fed therefrom. Further, such tube feeders are of many different lengths, and in length may range from a few feet to a couple of hundred feet. Many such feeders find extensive use in feed lots for the feeding of cattle. Whatever the particular size or construction details of such feeders or whatever the particular livestock fed therefrom, it is generally necessary that any one of such feeders must be able to effectively handle a wide variety of feeds. This requirement is a result of the present state of the science and business of feeding livestock. On one occasion such a feeder may have to handle a light fibrous feed such as hay. On another occasion the feed may be some type of silage or haylage. On still another occasion the feed may be granular or powered. It is also a common requirement that such tube feeders handle various combinations or mixtures of different types of feeds. Even when handling one particular type of feed it has been heretofore found that great variances can exist in weight, bulk, consistency, and many other physical factors of any one type of feed. It may therefore be appreciated that a feed responsive dump control must have adequate adjustability if it is to perform its functions with any degree of accuracy or reliability. The manner in which the present invention performs those functions will be apparent from the hereinafter following detailed description thereof.

The dump control of the present invention comprises electric switch means for controlling the dump cycle of the tube. The electric switch means is carried on the remote open end of the tube. Beneath the electric switch means a bell crank is pivotally carried in a certain arrangement for operating the electric switch means. On the depending arm of the bell crank a semicircular plate is carried by certain bushings and securing means to support the semicircular plate within the open end of the tube in such a manner that the semicircular plate may be adjusted by rotating the semicircular plate to a particular position, and by positioning the semicircular plate in different positions longitudinally of the open end of the tube and relative to the depending arm of the bell crank. Means is also provided for adjusting the semicircular plate upwardly and downwardly within the open end of the tube. Simple as the present invention is, it has been found in reductions to practice of the invention that an extremely effective, efficient and reliable feed responsive dump control is provided thereby for a wide variety of feeds.

The tube feeder shown in the drawings is merely by way of example and the present invention may be adapted by one skilled in the art to other types of tube feeders. In the tube feeder shown, the tube is designated with the numeral 10. The tube 10 is cylindrilcally shaped and is provided with a series of longitudinally spaced apart openings 11. The end of the tube 10 which receives the feed may be called the near end of the tube, and that end is rotatively carried on a stand or frame 12. The near end of the tube 10 opens into the lower end of a feed hopper 13, and is provided with a ring gear or sprocket 14 for rotating the tube 10. A drive chain 15 engages the ring gear 14 and a gear or drive sprocket 16 on a motor 17. Although not important to the present invention, note may be made of the fact that the motor 17 of such feeders is generally a relatively light fractional horsepower motor, and although it may be called the motor which rotates the tube 10, it actually does not so function especially with tube arrangements of great lengths. In arrangements of great tube lengths, the continuously rotating auger conveyor is the primary source of power for rotating the tube 10, and in such installations it is more accurate to describe the motor 17 as a brake or lock. In such installations, when the motor 17 is energized, it will permit the auger conveyor to rotate the tube 10, and when the motor 17 is de-energized it becomes an effective brake causing the tube 10 to stop rotating. The present invention provides means for energizing and de-energizing the motor 17 irrespective of whether the motor specifically rotates the tube 10 or permits the tube 10 to rotate.

The remote end of the tube 10 is rotatively carried in a stand 18. The stand 18 comprises a U-shaped tubular member 20 defining a pair of spaced apart legs. The lower ends of the legs of the tubular member 20 are provided with extensions 21 for varying the height of the stand 18. The upper portion of the tubular member 20 is provided with a bracket 22 which extends between the legs thereof. The bracket 22 carries a pair of rollers 23. The tube 10 is further provided with a flange or collar 24 which is carried on the rollers 23 to rotatively support the remote end of the tube 10. Although FIGURE 1 shows a single length of tube 10 and one stand 18, it may be appreciated that the tube 10 may be made of multiple tube sections with a stand 18 disposed at each tube section junction.

An auger conveyor 26 is carried in the tube 10 and extends from within the hopper 13 to a point adjacent the remote end of the tube 10. A motor such as motor 27 is provided for rotating the auger conveyor 26.

From the foregoing it may be seen that if feed is supplied to the hopper 13, that feed will be picked up by the flights of the auger conveyor 26 and carried thereby through the length of the tube 10 to the remote end thereof. When the desired quantity of feed is in the tube 10, the tube 10 may be overturned to dump the feed therefrom through the openings 11. It is a common operating arrangement of such tube feeders that the auger conveyor 26 be operated continuously during a feeding operation, and that the drive to the tube 10 be so arranged that the tube 10 in dumping is rotated in the same direction as the auger conveyor 26. The auger conveyor 26 may be provided with what is commonly called left or right hand flighting. For purposes of explanation it will be assumed that the auger conveyor 26 is provided with left hand flighting. In order to distribute feed longitudinally of the tube 10 it is necessary that the auger conveyor 26 with left hand flighting be rotated in a counterclockwise direction as viewed from the remote end of the tube 10. Thus, the motor 17 will also be wired to provide for counterclockwise rotation of the tube 10 for dumping thereof as viewed from the remote end of the tube. It is a characteristic of an auger conveyor that feed being moved thereby will tend to roll or slide up one wall of the tube 10 above the lowest point thereof. With the left hand flighting of auger conveyor 26, the feed, some of which is shown in FIGURE 2 with the designation 30, will be higher on the right hand side of the tube 10 than the left hand side thereof, considering the right and left hands of a person facing the remote end of the tube 10. The degree of climb of the feed is of course dependent upon the characteristics of the feed, a feed such as corn kernels tending to roll to a lower position than a feed such as silage. It further often occurs in the use of an auger conveyor that the leading portion of a quantity of feed being delivered thereby will taper downwardly toward the remote end of the tube with the leading end often amounting to no more than a dribble of feed. With the commonly experienced variations in any one batch of feed it will further often occur that a dense slug or mass of feed will precede the main charge of feed moving longitudinally of the tube 10. With the foregoing facts relating to auger conveyed feed it may be seen that if a dump control is to have any reasonable effectiveness it must be adjustable for the roll or slide of feed up one side of the tube. It must further be adjustable to avoid causing a premature initiation of the dump cycle responsive to the small dribble of the leading end of a quantity of feed, or responsive to the reception at the remote end of a slug of feed substantially different from the main feed charge.

The dump control of the present invention comprises an electric switch 31 which is supported on a plate 32 which in turn is carried in a U-shaped bracket 33. The U-shaped bracket 33 is carried on the upper end of the stand 18 over the remote end of the tube 10. An electrical conduit 34 extending between the switch 31 and the near end of the tube 10 is provided to carry power conductors between the motor 17 and the switch 31. The operating mechanism of the switch 31 depends from the underside thereof and is engaged by one leg of a bell crank 35. The bell crank 35 is provided with one relatively short leg and one long depending leg. On the inner side of the junction of the two legs of the bell crank 35 a bushing 36 is provided. A bolt 37 is journaled through the extending legs of the U-shaped bracket 33 and the bushing 36 to pivotally support the short leg of the bell crank 35 in a generally horizontal plane beneath the operating mechanism of the electric switch 31 with the long leg of the bell crank 35 depending over the open remote end of the tube 10. A coiled spring 38 wound about the shaft of the bolt 37 and engaging the bracket 33 and the bell crank 35 resiliently secures the bell crank 35 against haphazard swinging.

The remote open end of the tube 10 is provided with a notched out portion 40, the edges of which are bevelled as may be seen in the drawings. The notched out portion 40 of the tube 10 admits a roller or rod 41 when the tube 10 is generally positioned with the openings 11 on the upper side thereof. The roller 41 is carried on the side of the depending arm of the bell crank 35 toward the tube 10, and is supported between a pair of flanges 42 which are secured to the depending arm of the bell crank 35. When the tube 10 is rotated more than a relatively small amount, the roller 41 will roll or slide over one bevel of the notch 40 and will ride on the edge of the tube 10 in a manner such as shown in FIGURE 4. When the depending arm of the bell crank 35 is swung outwardly of the tube 10 a substantial distance and when the roller 41 is riding upon the edge of the tube 10, the horizontal leg of the bell crank 35 is pivoted away from the electric switch 31 a distance which is sufficient to permit the electric switch 31 to operate.

One form of construction of the electric switch 31 which will provide for proper operation thereof when the depending arm of the bell crank 35 is swung outwardly as described is shown in diagrammatic form in FIGURES 3 and 4. As may be seen in FIGURE 3, the pole 44 of the switch 31 is separated from its associated contact 45 by the dotted line operating mechanism of the switch 31 when the horizontal arm of the bell crank 35 is disposed substantially horizontally. FIGURE 4 shows that when the horizontal arm of the bell crank 35 is removed from contact with the operating mechanism of the switch 31, the pole 44 will be caused to engage its associated contact 45 by the biasing force of the coiled spring 46 to thereby complete an appropriate operating circuit for the motor 17.

From the foregoing it may be seen that when the depending arm of the bell crank 35 is moved outwardly a distance sufficient to permit switch 31 to operate, the motor 17 will be operated to cause the tube 10 to be rotated. If the outward swing of the depending arm of the bell crank 35 is not maintained for a length of time sufficient to cause the roller 41 to engage the edge of the tube 10, the bell crank 35 will break the operating circuit for the motor 17 when the bell crank 35 is permitted to swing back to the position shown in FIGURE 3. Once the roller 41 is riding on the edge of the tube 10, the bell crank 35 will be maintained in the position shown in FIGURE 4 and the tube 10 will be rotated substantially one complete revolution at which time the roller 41 may again drop into the notched out portion 40 of the tube 10 to permit the bell crank 35 to assume the position shown in FIGURE 3 whereby the electric switch 31 is operated to break the operating circuit for the motor 17. As the tube 10 rotates through one revolution thereof, feed within the tube 10 will be delivered from the holes 11 thereof by gravity and by the rotation of the auger conveyor 26. The width of the notched portion 40 of the tube 10 permits of a number of slight incremental rotations of the tube 10 without a complete rotation thereof until the bell crank 35 is swung outwardly and maintained thereat for more than a minimal amount of time.

The dump control further comprises a plate 47 which is supported in a certain adjustable arrangement on the lower end of the depending arm of the bell crank 35. The plate 47 is substantially semicircular in shape with the radius thereof smaller than the radius of the tube 10. The plate 47 is provided with a hole therethrough substantially at the inner end of a radius thereof. The hole in the plate 47 permits the plate 47 to be carried on the head end of a bolt 48. The lower end of the depending arm of the bell crank 35 is provided with a vertically disposed slot 50 which may be easily seen in FIGURE 2. The slot 50 will admit the bolt 48. A plurality of sleeves 51 are also provided. The sleeves 51 are positionable over the bolt 48 to space the plate 47 from the depending arm of the bell crank 35. If both sleeves 51 are placed on the bolt 48 after the plate 47, the threaded end of the bolt 48 may be inserted through the slot 50 of the depending arm of the bell crank 35 and a nut 52 is then threaded on the end of the bolt 48 to firmly secure the entire arrangement to the bell crank 35 with the bolt 48 extending perpendicularly from the depending arm of the bell crank 35 and with the plate 47 disposed substantially parallel thereto as shown in FIGURE 3. With both of the sleeves 51 positioned between the plate 47 and the bell crank 35, the plate 47 is carried at its maximum position inwardly of the open remote end of the tube 10. The plate 47 may be moved outwardly of that position by a placement of the sleeves 51 such as shown in FIGURE 5, one sleeve 51 being carried on the bolt 48 on each side of the depending arm of the bell crank 35.

Further, by appropriate loosening of the nut 52 the rotative position of the plate 47 relative to the tube 10 may be varied, or the bolt 48 may be moved lengthwise of the slot 50 to adjust the position of the edges of the plate 47 relative to the inner wall of the remote end of the tube 10. The plate 47 in being adjustably carried within the open remote end of the tube 10 in the described arrangement is capable of receiving and responding to the force of many different types and mixtures of feed delivered to the remote end of the tube 10 by the auger conveyor 26. When the particular feed or feed mixture for which the plate 47 is adjusted engages the plate 47, the bell crank 35 will be pivoted outwardly to a position such as shown in FIGURE 4 to initiate a dump cycle of the feeder. The high versatility of the invention may be seen from the foregoing description and a consideration of different feed conditions which may exist within the remote end of the tube 10. The examples hereinafter noted are not intended to completely describe all possible feed conditions but merely a few examples thereof. Firstly, assuming the auger conveyor 26 is delivering a feed 30 such as shown in FIGURE 2 which tapers toward the leading end thereof so that when the first charge or dribble of feed reaches the remote end of the tube, the tube 10 is still not sufficiently filled, the plate 47 may be adjusted to a position such as shown in FIGURE 2. The leading portion of the feed 30 may then fall from the remote end of the tube 10 without causing the bell crank 35 to swing outwardly until a sufficiently large volume of feed reaches the remote end of the tube 10 to engage the plate 47. In another situation it may be assumed that the leading portion of the feed does not ride up one side of the tube 10 such as the feed 30 in FIGURE 2, but assumes a lower central position by virtue of the feed having the characteristic of being relatively easily slidable or rollable down the inner wall of the tube 10. It may then be desirable to adjust the plate 47 to a position where it is moved clockwise of that shown in FIGURE 2 to permit the leading end or dribble of feed to escape from the remote open end of the tube 10 before the full charge of the feed engages the plate 47. In a further situation it may be assumed that the feed being carried through the tube 10 is a mixture of feeds having two substantially different physical characteristics such that one of the feed constituents is partially carried along the bottom of the tube 10 at a faster rate than the other constituents. The plate 47 may be adjusted so that the cut away portion is disposed upwardly and the lower curved edge of the plate 47 may then be adjusted to appropriately clear the bottom of the tube 10 to permit the leading end of the faster moving feed to escape the plate 47 by passing beneath the plate 47 with the thereafter following main charge of feed striking and swinging the plate 47 outwardly. In another situation the character of feed may be such that when the feed leaves the remote end of the auger conveyor 26 it is desirable that the feed almost substantially immediately engage the plate 47. Thus the plate 47 may be adjusted with the two sleeves 51 between the plate 47 and the bell crank 35 as in FIGURE 3. Conversely it may be desirable that the feed not immedately engage the plate 47, and the plate 47 may then be adjusted to a position such as shown in FIGURE 5. Although a number of the foregoing examples describe adjustment of the plate 47 for feed responsive swinging of the bell crank 35 to a full charge of feed, the converse in each instance may also be desirable. Taking an extreme case for an example, it may be desired to dump the tube 10 responsive to a small amount of feed such as feed 30 reaching the remote open end of the tube 10. Thus the plate 47 may be rotated 180 degrees from the position shown in FIGURE 2; it may be carried closely adjacent to the remote end of the conveyor 26 such as shown in FIGURE 3; and the bolt 48 may be positioned in the slot 50 so that the lower edge of the plate 47 is closely spaced to the bottom of the tube 10. Other adjustments of the plate 47 will be readily apparent to those skilled in the art, and thus it is not necessary to further lengthen this description by reference to other feed situations to which the subject invention will readily respond when properly adjusted to provide the desired dumping of the tube 10.

Having described the invention what is considered new and desired to be protected by Letters Patent is:

1. In a tube feeder having a feed carrying tube with an open remote end, feed responsive means comprising a plate having an area substantially less than the cross sectional area of said open remote end of said tube, and adjusting means for adjustably carrying said plate substantially perpendicular to the axis of said tube in said open remote end of said tube and in a particular selected area of the cross sectional area of said open remote end of said tube for intercepting feed delivered to said particular selected area and for avoiding feed delivered to other areas of the cross sectional area of said open remote end of said tube.

2. In a tube feeder as defined in claim 1, wherein said adjusting means further includes means for selectively adjusting the position of said plate axially of said open remote end of said tube.

3. In a tube feeder having a feed carrying tube with an open remote end, feed responsive means comprising, a generally semicircular plate having a radius less than the radius of said open remote end of said tube, and adjusting means for adjustably carrying said plate perpendicular to the longitudinal axis of said open remote end of said tube and in a particular selected area of the cross sectional area of said open remote end of said tube for intercepting feed delivered to said particular selected area and for avoiding feed delivered to other areas of the cross sectional area of said open remote end of said tube.

4. In a dump tube feeder as defined in claim 3, and said adjusting means further including means for selectively positioning said plate axially of said tube.

5. In a tube feeder having a feed carrying tube with an open remote end, feed responsive means comprising, a generally semicircular plate having a radius less than the radius of the open remote end of said tube, said plate further being formed with a hole therethrough, and adjusting means extending through said hole in said plate to carry said plate substantially perpendicular to the longitudinal axis of said open remote end of said tube, said adjusting means being formed to permit selective positioning of said plate about the axis of said hole in a particular selected area of the cross sectional area of said open remote end of said tube to intercept feed delivered to said particular selected area and for avoiding feed delivered to other areas of the cross sectional area of said open remote end of said tube.

6. In a tube feeder as defined in claim 5, and said adjusting means further including means for adjustably positioning said plate axially of said open remote end of said tube.

7. In a tube feeder as defined in claim 6, and said adjusting means additionally including means for adjustably shifting said plate radially of said open remote end of said tube.

8. In a tube feeder having a feed carrying tube with an open remote end, a dump control selectively responsive to different feeds delivered in different quantities and in different areas of said open remote end of said tube, said dump control comprising switch means carried over the open remote end of said tube, a pivotally carried lever cooperating with said switch means to control the operation of said switch means responsive to pivotal movements of said lever, a plate having a total area substantially less than the total area of said open remote end of said tube, means for adjustably carring said plate on said lever with said plate positioned in said open remote end of said tube to receive feed thereagainst which is delivered to said open remote end of said tube, said last mentioned means being formed to permit said plate to be selectively positioned within said open remote end of said tube to receive different feeds in different quantities and in different areas of said open remote end of said tube.

9. In a tube feeder having a feed carrying tube with an open remote end, a dump control comprising, a dump switch carried over the open remote end of said tube, feed responsive means for controlling the operation of said dump switch, said feed responsive means comprising a plate having an area substantially less than the cross sectional area of said open remote end of said tube, and adjustable support means carrying said plate substantially perpendicular to the axis of said tube in said open remote end of said tube and in a selected area of the cross sectional area of said open remote end of said tube for intercepting feed delivered to said selected area to operate said dump switch and for avoiding feed delivered to other areas of the cross sectional area of said open remote end of said tube.

10. In a tube feeder as defined in claim 9, wherein said adjustable support means further includes means for selectively adjusting the position of said plate axially of said open remote end of said tube.

11. In a tube feeder having a feed carrying tube with an open remote end, a dump control comprising, a dump switch carried over the open remote end of said tube, feed responsive means for controlling the operation of said dump switch, said feed responsive means comprising a generally semicircular plate having a radius less than the radius of said open remote end of said tube, and adjustable support means for adjustably carrying said plate perpendicular to the longitudinal axis of said open remote end of said tube and in a particular selected area of the cross sectional area of said open remote end of said tube for intercepting feed delivered to said particular selected area to operate said dump switch and for avoiding feed delivered to other areas of the cross sectional area of said open remote end of said tube.

12. In a dump tube feeder having a feed carrying tube with an open remote end, a dump control comprising, a dump switch carried over the open remote end of said tube, feed responsive means for controlling the operation of said dump switch, said feed responsive means comprising a bell crank pivotally carried at the open remote end of said tube with one leg thereof in a generally depending position and with the other leg thereof cooperating with said dump switch to control the operation of said dump switch responsive to pivotal movements of said depending leg, a generally semicircular plate having a radius less than the radius of the open remote end of said tube, said plate further being formed with a hole therethrough, and adjustable support means extending through said hole in said plate and connected to said depending leg to carry said plate substantially perpendicular to the longitudinal axis of said open remote end of said tube, said adjustable support means being formed to permit selective positioning of said plate about the axis of said hole in a particular selected area of the cross sectional area of said open remote end of said tube to intercept feed delivered to said particular selected area to thereby pivot said depending leg and for avoiding feed delivered to other areas of the cross sectional area of said open remote end of said tube.

13. In a tube feeder as defined in claim 12, and said adjustable support means further including means for adjustably positioning said plate axially of said open remote end of said tube.

14. In a tube feeder as defined in claim 13, and the connection of said adjustable support means to said depending leg being formed to permit selective shifting of said plate radially of said open remote end of said tube.

15. In a tube feeder as defined in claim 12, and said adjustable support means comprising a bolt and nut and a plurality of sleeves, said depending leg having an opening formed therethrough, and said bolt being inserted through said hole in said plate, said plurality of sleeves and through said opening in said depending leg with said nut threaded on the end of said bolt to firmly secure said plate to extend substantially perpendicular to the longitudinal axis of said open remote end of said tube and inwardly of said open remote end of said tube.

16. In a tube feeder as defined in claim 15, and said opening through said depending leg being formed in the shape of a slot to permit selective shifting of said plate radially of said open remote end of said tube.

17. In a feeder having an elongated housing with an open remote end to which feed is carried by an auger in said housing, feed responsive means comprising a plate, and adjustable means pivotally carrying said plate substantially perpendicularly to the axis of said housing at said open remote end of said housing and in a particular selected area of the cross sectional area of said open remote end of said housing for intercepting feed delivered to said particular selected area.

18. In a feeder having an elongated housing with an open remote end to which feed is carried by an auger in said housing, means for dumping feed from said housing along the length thereof, feed responsive means comprising a plate, said plate pivotally carried at said open remote end of said housing, means normally maintaining said plate in a position which is substantially perpendicular to the axis of said housing in a particular selected area of the cross sectional area of said open remote end of said housing for intercepting feed delivered to said particular area, and means connected to said plate for operating said dumping means responsive to the outward pivoting of said plate by the interception of feed delivered to said particular selected area.

References Cited by the Examiner

UNITED STATES PATENTS

| | | | |
|---|---|---|---|
| 1,134,600 | 4/15 | Filson | 198—64 |
| 2,681,610 | 6/54 | Schrock | 198—213 X |
| 2,991,870 | 7/61 | Griffith et al. | 198—64 |

SAMUEL F. COLEMAN, *Primary Examiner.*

WILLIAM B. LA BORDE, *Examiner.*